US007383165B2

United States Patent
Aragones

(10) Patent No.: US 7,383,165 B2
(45) Date of Patent: Jun. 3, 2008

(54) SYSTEM AND METHOD FOR DIAGNOSING FAULTS UTILIZING BASELINE MODELING TECHNIQUES

(75) Inventor: James Kenneth Aragones, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 521 days.

(21) Appl. No.: 10/707,656

(22) Filed: Dec. 30, 2003

(65) Prior Publication Data

US 2004/0172228 A1  Sep. 2, 2004

Related U.S. Application Data

(63) Continuation-in-part of application No. 09/682,314, filed on Aug. 17, 2001.

(51) Int. Cl.
  *G06F 9/455* (2006.01)
(52) U.S. Cl. ............... 703/8; 705/10; 705/8; 707/104.1; 701/100; 701/29
(58) Field of Classification Search ............... 703/8; 705/10, 8; 707/104.1; 701/100, 14, 111, 701/29; 700/272; 702/182, 185; 345/713; 750/10, 8
  See application file for complete search history.

(56) References Cited

U.S. PATENT DOCUMENTS

| | | | | |
|---|---|---|---|---|
| 4,215,412 A | * | 7/1980 | Bernier et al. | 701/100 |
| 5,050,081 A | * | 9/1991 | Abbott et al. | 701/14 |
| 5,687,082 A | * | 11/1997 | Rizzoni | 701/111 |
| 6,047,593 A | * | 4/2000 | Scher et al. | 73/118.1 |
| 6,067,486 A | | 5/2000 | Aragones et al. | |
| 6,151,582 A | * | 11/2000 | Huang et al. | 705/8 |
| 6,216,066 B1 | * | 4/2001 | Goebel et al. | 701/29 |
| 6,317,654 B1 | * | 11/2001 | Gleeson et al. | 700/272 |
| 6,473,677 B1 | | 10/2002 | Hershey et al. | |
| 6,487,490 B1 | * | 11/2002 | Kamath et al. | 701/100 |
| 6,591,182 B1 | * | 7/2003 | Cece et al. | 701/100 |
| 6,601,015 B1 | * | 7/2003 | Milvert et al. | 702/182 |
| 6,606,580 B1 | * | 8/2003 | Zedda et al. | 702/185 |
| 6,631,384 B1 | * | 10/2003 | Richman et al. | 707/104.1 |
| 6,832,205 B1 | * | 12/2004 | Aragones et al. | 705/10 |
| 7,031,878 B2 | * | 4/2006 | Cuddihy et al. | 702/182 |
| 2001/0032109 A1 | * | 10/2001 | Gonyea et al. | 705/8 |
| 2002/0173897 A1 | * | 11/2002 | Leamy et al. | 701/100 |
| 2003/0034995 A1 | * | 2/2003 | Osborn et al. | 345/713 |
| 2003/0036891 A1 | | 2/2003 | Aragones et al. | |
| 2003/0045992 A1 | * | 3/2003 | Humerickhouse et al. | 701/100 |

OTHER PUBLICATIONS

U.S. Appl. No. 10/707,655, Aragones.
U.S. Appl. No. 10/707,657, Aragones.
"Multiple Regression," http://www2.chass.nscu.edu/garson/pa765/regress.htm, pp. 1-27 (printed Oct. 22, 2003).
"Introduction to Regression Analysis," http://www.nlreg.com/intro.htm, pp. 1-3 (printed Oct. 22, 2003).

* cited by examiner

*Primary Examiner*—Paul L Rodriguez
*Assistant Examiner*—Kandasamy Thangavelu
(74) *Attorney, Agent, or Firm*—Fletcher Yoder

(57) ABSTRACT

System, method and computer product for baseline modeling a product or process. A service database contains process data. A preprocessor processes the data into a predetermined format. A baseline modeling component builds a baseline model from the preprocessed data, wherein the baseline model relates process performance variables as a function of process operating conditions.

41 Claims, 9 Drawing Sheets

SYSTEM AND METHOD FOR DIAGNOSING FAULTS UTILIZING BASELINE MODELING TECHNIQUES

CROSS REFERENCE TO RELATED APPLICATIONS

The present application is a continuation-in-part of copending U.S. patent application Ser. No. 09/682,314, filed on Aug. 17, 2001, the entirety of which is incorporated by reference herein.

BACKGROUND OF THE INVENTION

The present invention relates generally to systems and methods for improving the quality and productivity of a product or process and more particularly to baseline modeling of a product or process.

Baseline modeling of a product or process generally provides an understanding of the performance of an "ideal" product or process over time. An engine is one type of product or process that baseline modeling is suitable for use. Engine baseline modeling has a multitude of uses including, but not limited to, determining when an engine performs out of specification, predicting when an engine failure will occur, detecting abnormal conditions, determining the quality of an engine and designing new engines. Typically, engine baseline models are developed from data gathered from thermodynamic cycle analyses and simulation. First, models of ideal values are created and indexed by variables such as altitude, temperature, power setting, and air speed. Once data from the normal operation of the engine is available, these models are updated by analyzing data corresponding to a particular model characteristic. An engineer then looks for data that are similar for the specified engine variables (e.g., altitude, temperature, power setting, air speed), groups the similar data, averages them for each variable and performs other operations as desired. The engineer then plots data for each of the variables. The plots provide interrelationship information between each of the engine variables, which the engineer uses to create tables of typical operational parameters of the baseline model. These tables of parameters are used as the basis of comparison for engine operation. Differences from the baseline model may indicate engine faults or deterioration trends.

There are several problems associated with this type of engine baseline modeling. First, this type of engine baseline modeling is very labor intensive because the engineer has to review the data, find data that are similar, group and average the data, perform other desired operations on the data, plot the data and create tables. Another problem is that one engineer cannot readily reproduce an engine baseline model developed by another engineer because this process is very individualized. It is helpful if one engineer can reproduce the engine baseline model generated by another engineer to validate quality of the baseline. Another problem associated with this type of engine baseline model is that the resulting model does not provide a good picture of an engine operating outside normal conditions. Furthermore, this type of engine baseline modeling does not provide a measure of how good the developed model is.

Accordingly, there is a need in the art of statistical modeling for an automated approach to engine baseline modeling that standardizes the process to improve reliability by minimizing human interventions.

BRIEF SUMMARY OF THE INVENTION

The present invention overcomes the problems noted above, and provides additional advantages, by providing a system, method and computer readable medium that stores instructions for instructing a computer system, to perform engine baseline modeling. In one embodiment of the present invention, an engine service database contains engine data relating to time varying measurements for at least one engine. A preprocessor processes the engine data into a predetermined format. An engine baseline modeling component builds an engine baseline model from the preprocessed data, using a regression analysis, and wherein the output engine baseline model is adjusted for time varying effects on the measured/modeled data and parameters. Estimated trends for each parameter of the baseline are calculated to assist in fault determination.

BRIEF DESCRIPTION OF THE DRAWINGS

The present invention can be understood more completely by reading the following Detailed Description of Preferred Embodiments, in conjunction with the accompanying drawings.

DETAILED DESCRIPTION OF THE PREFERRED EMBODIMENTS

Figure 1:
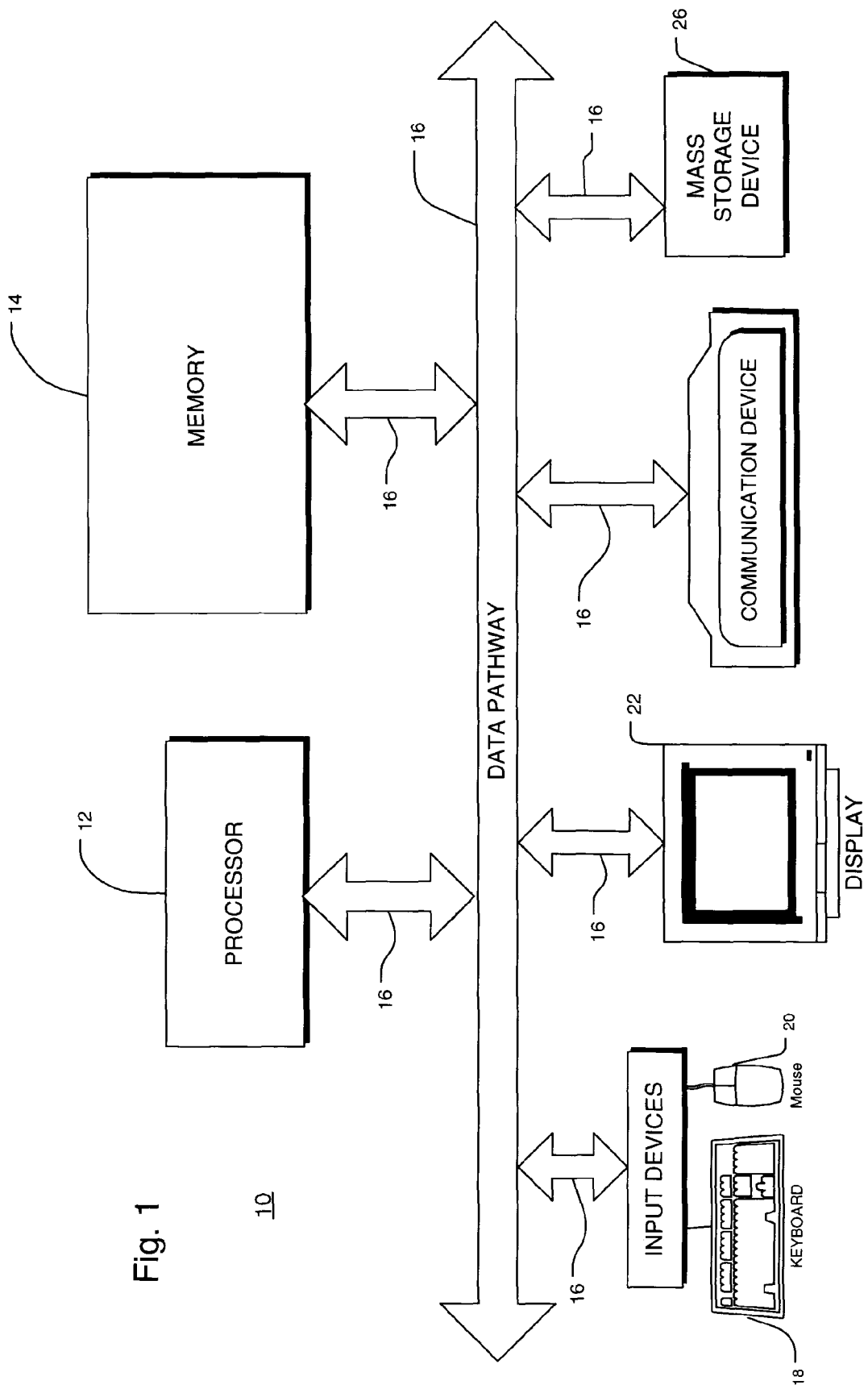
FIG. 1 shows a schematic diagram of a general-purpose computer system in which a system for performing engine baseline modeling operates.

This disclosure describes a system, method and computer product for baseline modeling of a product or process such as an aircraft engine, however, the disclosure is applicable to any type of product or process where it is desirable to model performance. FIG. 1 shows a schematic diagram of a general-purpose computer system in which a system for performing engine baseline modeling operates. The computer system 10 generally comprises a processor 12, memory 14, input/output devices, and data pathways (e.g., buses) 16 connecting the processor, memory and input/output devices. The processor 12 accepts instructions and data from memory 14 and performs various operations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
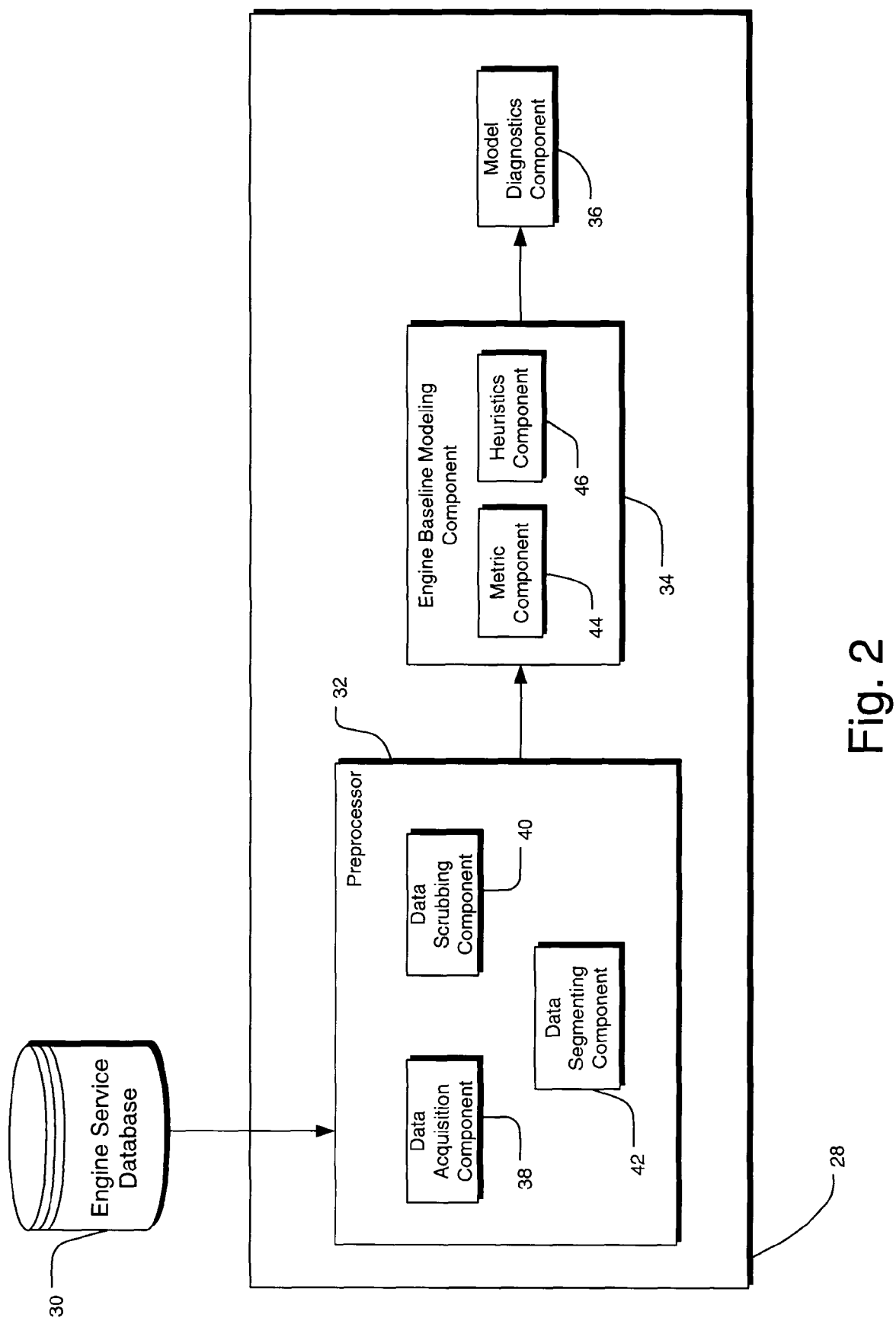
FIG. 2 shows a top-level component architecture diagram of the engine baseline modeling system that operates on the computer system shown in FIG. 1.

FIG. 2 shows a top-level component architecture diagram of an engine baseline modeling system 28 that operates on the computer system 10 shown in FIG. 1. Generally, the engine baseline modeling system 28 models the performance of an "ideal engine for a specified type aircraft engine. An engine baseline model built with the engine baseline modeling system 28 has a multitude of uses. An illustrative, but non-exhaustive list of potential uses for an engine baseline model built from the engine baseline modeling system 28 includes monitoring engine status, predicting future engine behavior, diagnosing engine faults, determining when an engine performs out of specification, determining the quality of an engine and designing new systems for an engine.

In FIG. 2, there is an engine service database 30 that contains engine data for a variety of aircraft engines. The engine data comprises an assortment of engine performance information for each of the engines. Generally, engine performance information includes environmental data in which the engines operate such as altitude, air temperature, air speed, engine loading, engine temperature and pressure. One of ordinary skill in the art will recognize that the engine service database 30 may comprises other engine performance information such as mach, fan speed, etc. In addition, the engine service database 30 may comprise other data such as operational data. A non-exhaustive list of engine operational data stored in the engine service database 30 includes exhaust gas temperatures (EGT), shaft speed between compressors and turbines (N1 and N2), pressure combustion (Pa) and fuel flow (WF). One of ordinary skill in the art will recognize that other engine operational data may include engine bleed settings, vibration readings, and control mechanism settings. Also, the engine service database 30 may comprise other data such as aircraft operating and settings data (e.g., bleed settings).

One of ordinary skill in the art will recognize that there are a variety of approaches to acquiring the above data and storing them in the engine service database 30. For example, some data can be captured automatically using on-line data acquisition techniques, while other data can be captured using manually recording techniques or onboard data capture techniques. Furthermore, the engine service database 30 preferably stores the data in a format that permits users to import the data into other tools for further analysis, such as Microsoft EXCEL®, Minitab™, and SAS™.

The engine service database 30 may comprise other types of data for the engines. For example, the engine service database 30 may comprise service information for the engines. Generally, the service information will comprise information such as engine product information, age information of the engines and repair history of the engines (e.g., dates of service events, types of service events, etc.). Other types of engine data stored in the engine service database 30 may include in-flight data, engine utilization data (e.g., where, when, how flown), ownership data, remote monitoring and diagnostics status data.

Referring to FIG. 2, the engine baseline modeling system 28 comprises a preprocessor 32 that processes the engine data into a predetermined format. In particular, the preprocessor 32 comprises a data acquisition component 38 that extracts the engine data from the engine service database 30. The data acquisition component 38 acquires the service data by using commercially available modules available from Minitab™, Microsoft®, Oracle®, etc. which directly extract the data into the engine baseline modeling system 28, however, one of ordinary skill in the art will recognize that one can write specialized code to extract the data into a common format and write additional specialized code to import that into the system.

The preprocessor 32 performs computations that simplify future processing of the data, while a data scrubbing component 40 cleans the engine data. In particular, the preprocessor 32 performs operations that convert the data into standard units. For example, the preprocessor 32 can convert temperature data from Celsius to Kelvin or correct engine power setting data by the engine bleed settings. Other types of corrections that the preprocessor 32 may perform include converting pounds to kilograms, altitude to pressure, knots and altitude to mach number. One of ordinary skill in the art will recognize that the listed corrections are only illustrative of some possibilities and are not exhaustive of other possibilities. Furthermore, one of ordinary skill in the art will recognize that the preprocessor 32 can perform the corrections in any manner desired (e.g., Celsius to Rankine) and is not limited to the above order. Examples of cleaning operations performed by the data scrubbing component 40 include discarding data elements with missing values, correcting simple typographical errors, discarding data elements with erroneous values out of reasonable operating range, etc. One of ordinary skill in the art will recognize that the listed cleaning operations are only illustrative of some possibilities and are not exhaustive of other possibilities.

In addition, the preprocessor also comprises a data segmenting component 42 that segments engine data into groups, nodes or clusters that represent similar operating conditions. The groups generally include engine performance variables such as power setting, altitude, air speed (mach number), and air temperature. One of ordinary skill in the art will recognize that other engine performance variables such as air humidity and control settings may be selected and that the disclosure should not be limited to these variables. Once the groups have been selected, then the data segmenting component 42 can segment the data into the particular group that it relates to. Once the data are segmented into the groups, then the data segmenting component 42 can use a cluster analysis to determine clusters of operating conditions. Alternatively, an engineer may assign bands of operations of interest for each of the variables.

An engine baseline modeling component 34 builds an engine baseline model from the data processed by the preprocessor 32. In particular, the engine baseline model built by the engine baseline modeling component relates the selected performance variables as a function of engine operating conditions using the processed data. Engine operating conditions include engine, aircraft and environmental conditions. In this disclosure, the engine baseline model is built from a regression analysis. Generally speaking, a regression is the statistical science of determining an equation from a finite number of points that provides values of Y for a given X, i.e., Y=f(X). In this disclosure, the equation to be determined can be expressed as:

$$Y=f(\text{altitude, temperature, power setting, air speed}) \quad (1)$$

where altitude, temperature, power setting and air speed are the X variables. The engine baseline modeling component 34 performs a regression to determine the above equation for each of the selected engine performance variables (i.e., power setting, altitude, air speed, and air temperature) during specified times that the engine is operating. For instance, the engine modeling component 34 can perform the regression on the data taken during the take-off, climb and cruise for any or all of the engine performance variables. One of ordinary skill in the art will recognize that more engine performance variables (air humidity, control settings, etc.) or less engine performance variables can be used in equation 1. In addition, one of ordinary skill in the art will recognize that different combinations of engine performance variables can be used in equation 1.

In general, a regression fits a parametric equation to a set of data by solving for values of regression parameters such that the best fit to the data set is obtained. Multiple linear regression is a type of regression that solves the system of equations, minimizing the combined error. In this disclosure, the system of equations that the regression solves can be as follows:

$$y[1]=a^*\text{power setting}[1]+b^*\text{altitude}[1]+c^*\text{temperature}[1]+d^*\text{airspeed}[1]+\ldots+\text{error}[1]$$

$$y[2]=a^*\text{power setting}[2]+b^*\text{altitude}[2]+c^*\text{temperature}[2]+d^*\text{airspeed }[2]+\ldots+\text{error}[2]$$

$$y[n]=a^*\text{power setting}[n]+b^*\text{altitude}[n]+c^*\text{temperature}[n]+d^*\text{airspeed}[n]+\ldots+\text{error}[n] \quad (2)$$

wherein a, b, c, d are the regression parameters and power setting[1], altitude[1], temperature[1], airspeed[1], y[1] are observed events. Again, one of ordinary skill in the art will recognize that the system of equations can differ depending on the selection of engine performance variables.

The resulting parameter estimates for a, b, c and d are representative of the new baseline model. Instead of using tables to develop the baseline model as was done in the past, there is now a simple equation that describes the baseline behavior of the engine, from which either the tables may be generated, or the equation can be applied directly. For example, a baseline model for the exhaust gas temperature (EGT) parameter might be as follows:

$$EGT=0.1^*\text{power}+0.001^*\text{altitude}+0.01^*\text{temperature}+0.05^*\text{airspeed} \quad (3)$$

In this example, an engine that had power set to 100, altitude at 1000, temperature at 300, and air speed at 200, would result in a predicted EGT value of 24 degrees, but might have a measured EGT value of 14 degrees, which would indicate that the engine was 10 degrees below the predicted value.

The engine baseline modeling component 34 also comprises a metric component 44 that validates the engine baseline model. In particular, the metric component 44 validates the engine baseline model by examining the quality of the built model. In this disclosure, the metric component 44 determines the goodness of model fit by analyzing statistical goodness of fit metrics, such as R-squared, which is a common regression tool output. One of ordinary skill in the art will recognize that the metric component 44 can determine other metrics besides the R-squared metric such as the mean square error, sum square error and sigma metrics, which are other common regression tool outputs.

The engine baseline modeling component 34 also comprises a data cleaning heuristics component 46 that cleans the preprocessed data according to a set of heuristics. Generally, the data cleaning heuristics component 46 uses heuristics to remove data that does not conform to the norm. An illustrative, but non-exhaustive list of data that the data cleaning heuristics component 46 removes includes regression outliers, regression leverage points, and faulty engines. In this disclosure, this data cleaning operation can be performed for groups of engines or fleets of aircraft that use a common engine.

Additional details and embodiments relating to the engine baseline modeling component 34 will be set forth in detail below. In particular, inventive techniques are provided which additionally enhance the quality and reliability of the generated model.

FIG. 2 also shows that the engine baseline modeling system 28 comprises a model diagnostics component 36 that evaluates the performance of the engine baseline model. In particular, the model diagnostics component 36 generates statistical outputs that provide statistical information to a user of the engine baseline modeling system 28. An illustrative, but non-exhaustive list of the statistical outputs that the model diagnostics component 36 generates includes variance, $r^2$, collinearity, probability plots, residual plots, standard error measurements, confidence limits on the engine baseline model, prediction limits, pure error lack-of-fit test, data subsetting lack-of-fit test, multicolinearity metrics (variance inflation factors), autocorrelation of residuals (Durbin-Watson statistic), etc.

The algorithms performed by the components in the engine baseline modeling system 28 (i.e., the preprocessor 32, engine baseline modeling component 34 and model diagnostics component 36 can be programmed with a commercially available statistical package such as SAS, but other languages such as C or Java may also be used.

The engine baseline modeling system 28 is not limited to a software implementation. For instance, the preprocessor 32, engine baseline modeling component 34 and model diagnostics component 36 may take the form of hardware or firmware or combinations of software, hardware, and firmware. In addition, the engine baseline modeling system 28 is not limited to the preprocessor 32, engine baseline modeling component 34 and model diagnostics component 36. One of ordinary skill in the art will recognize that the engine baseline modeling system 28 may have other components.

Figure 3:
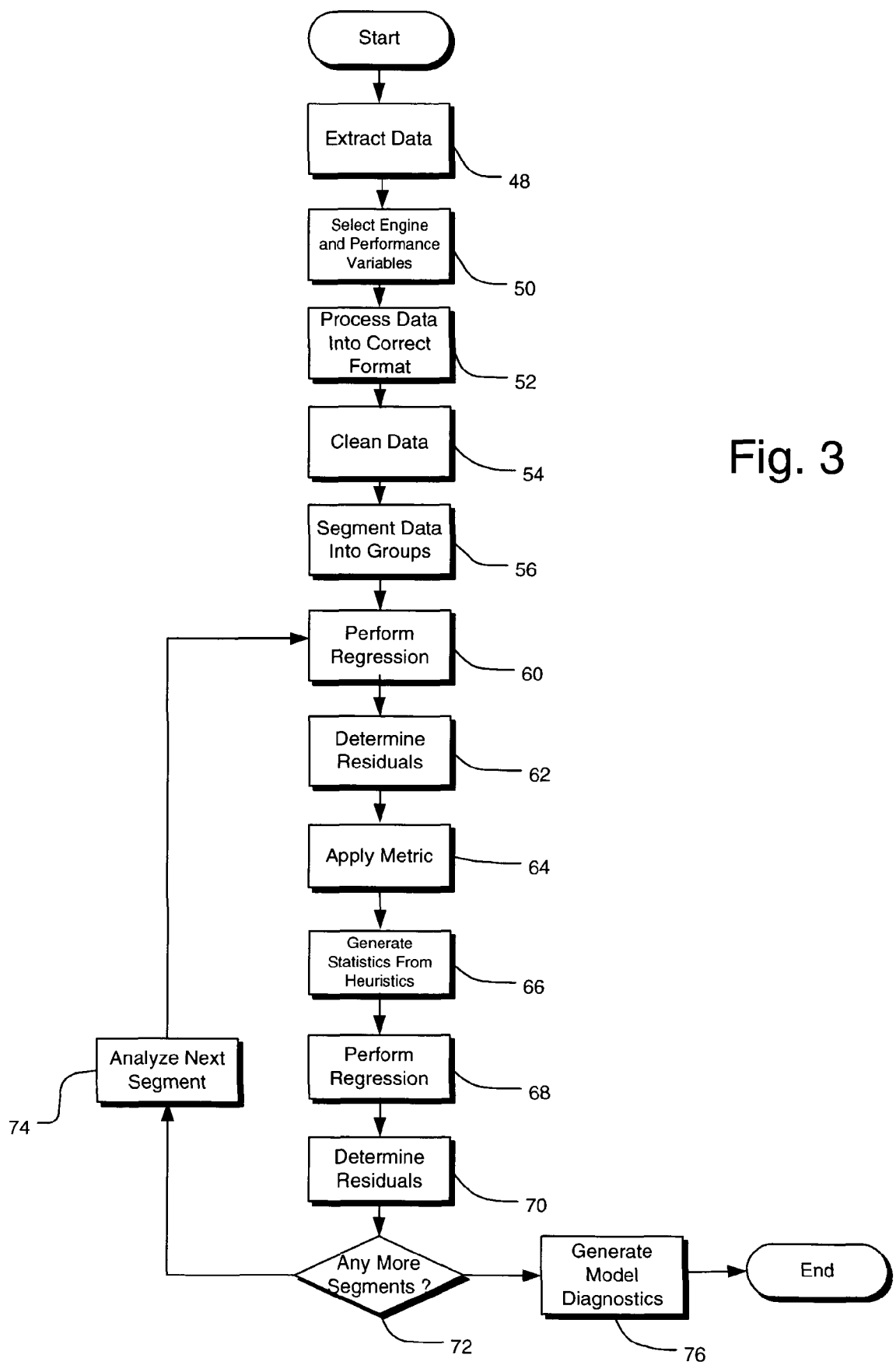
FIG. 3 shows a flow chart describing actions performed by the engine baseline modeling system shown in FIG. 2.

FIG. 3 shows a flow chart describing actions performed by the engine baseline modeling system 28 shown in FIG. 2. At block 48, the data acquisition component 38 extracts the engine data from the engine service database 30. Next, at 50 the user of the engine baseline modeling system 28 selects a particular engine model and engine performance variables for that engine that he or she would like to model (e.g., power setting, altitude, air speed and air temperature). The preprocessor 32 converts data into a standardized format at 52 and the data scrubbing component 40 cleans the engine data at 54. The data segmenting component 42 then segments the engine data into groups such as altitude, air speed and air temperature, fuel specific heat value, air humidity, control settings, etc. at 56.

After the data segmenting component 42 has segmented the engine data into groups, the engine baseline modeling component 34 builds an engine baseline model from the data processed by the preprocessor 32. In particular, the building of the engine baseline model begins with the engine baseline modeling component 34 performing a regression to determine parameters for each of the selected engine performance variables (e.g., altitude, air speed and air temperature) at 60. As mentioned above, the regression relates the engine performance variables as a function of engine operating conditions. The metric component 44 then determines the residuals of the regression at 62 and applies the metrics (e.g., R-square, mean square error, sum square error and sigma metrics) at 64. The term residuals refers to the differences between the actual values of the dependent variables and their predicted or estimated value for a particular observation. Next, the data cleaning heuristics component 46 cleans the preprocessed data according to a set of heuristics and generates certain statistics such as outliers and leverage points at 66. The engine baseline modeling component 34 then performs another regression at 68. The engine baseline modeling component 34 applies a second regression to improve the parameter estimates by using a cleaned data set. Again, the metric component 44 determines additional residuals at 70. Alternatively, the metric component 44 can generate plots of the residuals if a user desires. At 72, the engine baseline modeling component determines whether there are any more segments that have to be analyzed. If there are more segments, then the next segment is analyzed at 74 and blocks 60-72 are repeated. This process continues until it is determined at 72 that there are no more segments. Once it has been determined that there are no more segments, then the model diagnostics component 36 evaluates the performance of the engine baseline model at 76 and generates certain statistical outputs that relate to the model.

Figure 4:
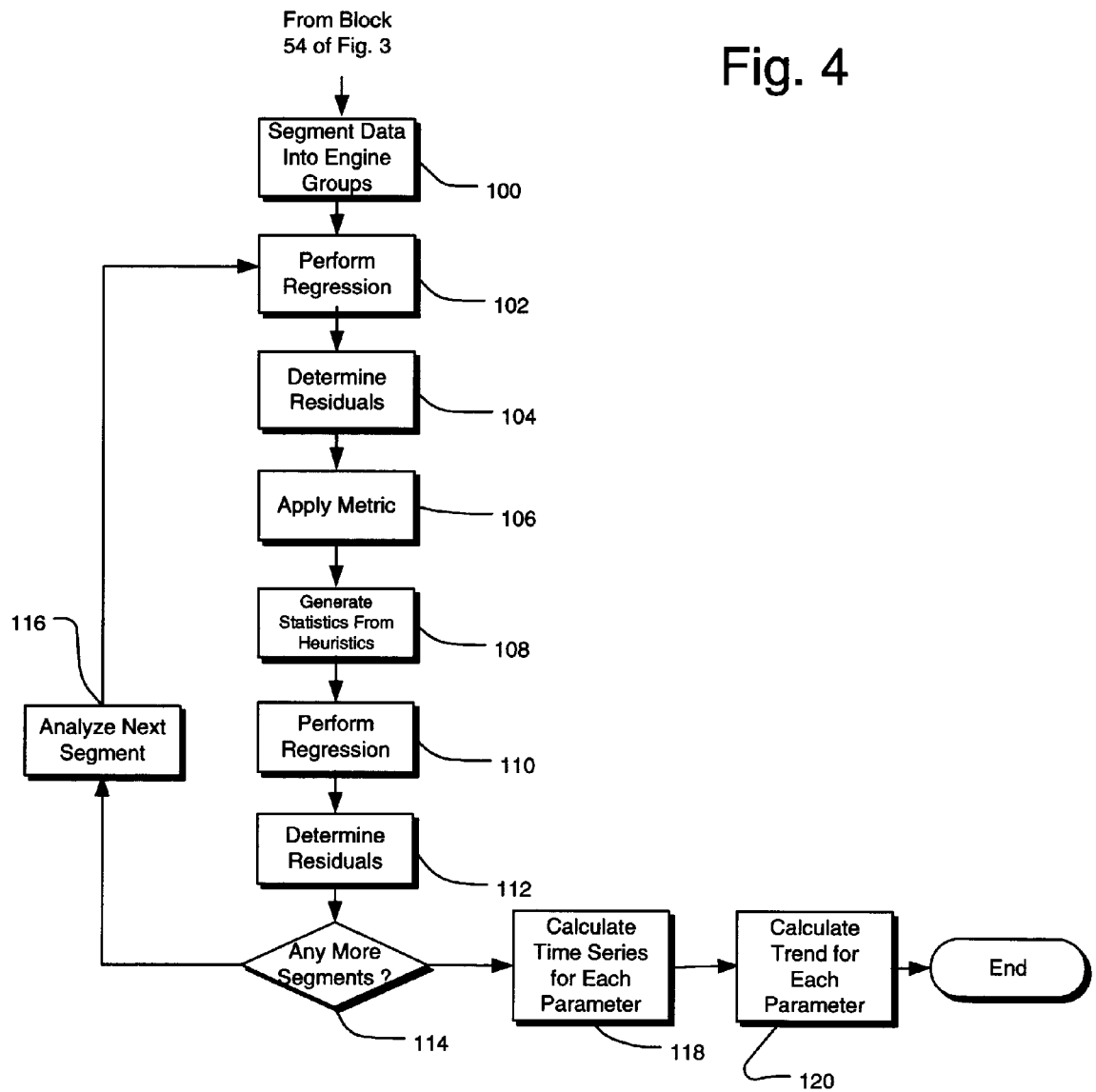
FIG. 4 is a flow chart describing one alternative embodiment for actions performed by the engine baseline modeling system of FIG. 3.

Referring now to FIG. 4, there is shown a flow chart describing one alternative embodiment for actions performed by the engine baseline modeling system 28 beginning at block 56 of FIG. 3. Contrary to the embodiment of FIG. 3 wherein a baseline model is computed using data for a fleet of engines over a long period of time, the present embodiment performs a similar analysis for individual engines. Changes to the calculated model are then used to determine the health or condition of the individual engine. More particularly, a step of segmenting engine data 100 is now characterized by grouping engine data by each specific engine and further including information regarding the time at which each measurement was recorded. Furthermore, inclusive in each engines data grouping could also alternatively include subgroupings or segments for any desired length of time. For example, engine data for a given engine could span across three years time. In accordance with the present embodiment, an engine baseline model could initially be calculated for this entire span. Additionally, subgroupings of engine data measurements based upon specific time intervals could also be used to generate baseline models. In one embodiment, baseline models for each distinct 60 day period could be calculated (e.g., days 1-60, days 61-120, etc.), resulting in 18 distinct baseline models. Alternatively, baseline models for each 60 day period within the overall span could be calculated (e.g., days 1-60, days 2-61, etc.), resulting in 1000 distinct baseline models.

Once engine segments have been identified, the system proceeds to block 102 where the engine baseline modeling component 34 builds an engine baseline model by performing a regression to determine parameters for each of the selected engine performance variables (e.g., altitude, air speed and air temperature) for a first data segment (i.e., grouped engine data for a selected time period). The metric component 44 then determines the residuals of the regression at block 104 and applies the metrics at block 106. Next, the data cleaning heuristics component 46 cleans the preprocessed data according to a set of heuristics and generates certain statistics such as outliers and leverage points at block 108.

The engine baseline modeling component 34 then performs another regression at block 110. Again, the metric component 44 determines additional residuals at block 112. At block 114, the engine baseline modeling component determines whether there are any more segments (e.g., time periods) that have to be analyzed. If there are more segments, then the next segment is analyzed at block 116 and blocks 102-114 are repeated. This process continues until it is determined at block 114 that there are no more segments. Once it has been determined that there are no more segments, a time series for each of the estimated parameters can be generated from the combination of models or estimates, (fan speed coefficient, air temperature coefficient, etc) at block 118. This results in a more accurate picture of engine state changes during the time under measurement. Based upon the time series of each estimated parameter generated in block 118, a trend for each parameter is calculated in block 120.

It has been determined that when faults occur in the system, the system"s baseline trend will often shift. Unfortunately, the shift only alerts you to a problem without pointing to a specific cause. As one example, consider a fuel economy trend: if vehicle fuel economy changes, one would expect to find a fault somewhere in the system. However, under the embodiment of FIG. 3, significant information regarding what the actual fault was would not present itself.

Figure 5:
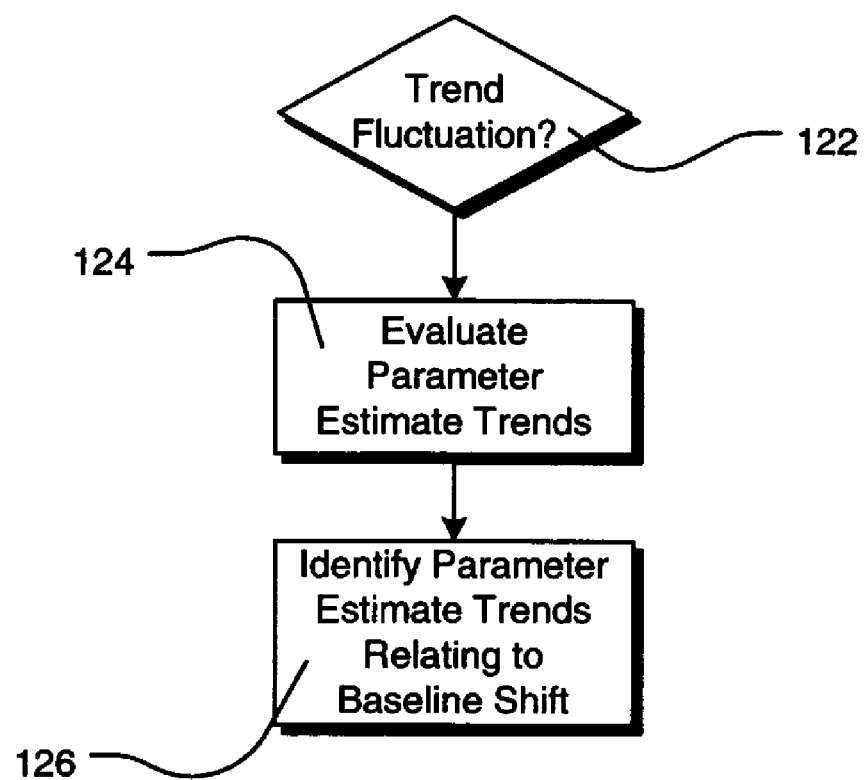
FIG. 5 is a flow chart illustrating one embodiment of a method for diagnosing system faults utilize the baseline models and engine parameter trends calculated in FIG. 4.

Referring now to FIG. 5, there is shown a flow chart illustrating one embodiment of a method for diagnosing system faults utilizing the baseline models and engine parameter trends calculated in FIG. 4. Initially, in block 122, the baseline model generated in FIG. 4 is monitored for trend fluctuations representative of an engine fault. In block 124, if a potential fault occurrence is identified, the parameter estimate trends associated with the model are evaluated. Because each of the parameter estimate trends calculated in block 120 basically remain constant for a stable system, one would expect one or more of these parameter estimate trends to shift when a corresponding engine baseline trend shift occurs. In block 126, one or more of the parameter estimate trends relating to the baseline model trend shift is identified as well its manner of fluctuation. Such parameter estimate trend shifts help narrow down the possible system faults.

Returning to the fuel economy example initially set forth above, if a baseline shift indicates a problem, one may identify that parameter estimate A has shifted downwards and parameter estimate B has shifted upwards. Conversely, one might see A and B remaining constant with a large shift in parameter C. This fault signature could be used to identify case 1 as a fuel system problem and case 2 as an air system problem, reducing the effort needed to diagnose the fault.

In essence, by calculating a variety of engine baseline models utilizing moving time windows, estimates for each parameter measured may be accurately trended, thereby synthesizing additional information useful for diagnosing the cause of the fault.

It should be understood that a variety of methods may be utilized in accordance with the present invention to identify faults reflective of the relationships between baseline model trend shifts and parameter estimate changes. In one embodiment, conditional probabilities may be utilized to identify such faults. In such an embodiment, the probabilities for each potential fault reflective of the trends/parameter estimate information obtained are determined. In the example set forth above, probabilities each potential fault (e.g., faulty fuel system, faulty air system etc.) given the changes identified in each parameter estimate A, B, and C would be calculated. The results of these probability calculations would then assist in identifying likely faults.

In a second embodiment, a case-based reasoning system may be employed to identify likely faults. Using this method, a set of "cases" are established correlating to various potential faults. Typically, these cases would be based upon measurements made during known fault occurrences. Once the cases have been established, changes in each parameter estimate are then compared to the cases and a closest case is identified as a likely fault.

In some circumstances, it has been determined that the parameters estimated relate to highly correlated variables. That is, changes in one parameter precipitate changes in another parameter (for example, air temperature drops when altitude increases). This correlation causes the parameter estimates to be unstable. Accordingly, an alternative embodiment of the present invention refines the above-described process, wherein the principle component analysis technique is utilized to map the initial engine data to an uncorrelated dataset. In a preferred embodiment, engine data relating to the parameter of interest are not mapped. This uncorrelated dataset is then used in the manner set forth above to compute the parameter estimate trends. These trends can then be used as before to diagnose the faults using a decision making technique such as an expert system, case-based reasoning, etc.

Figure 8:
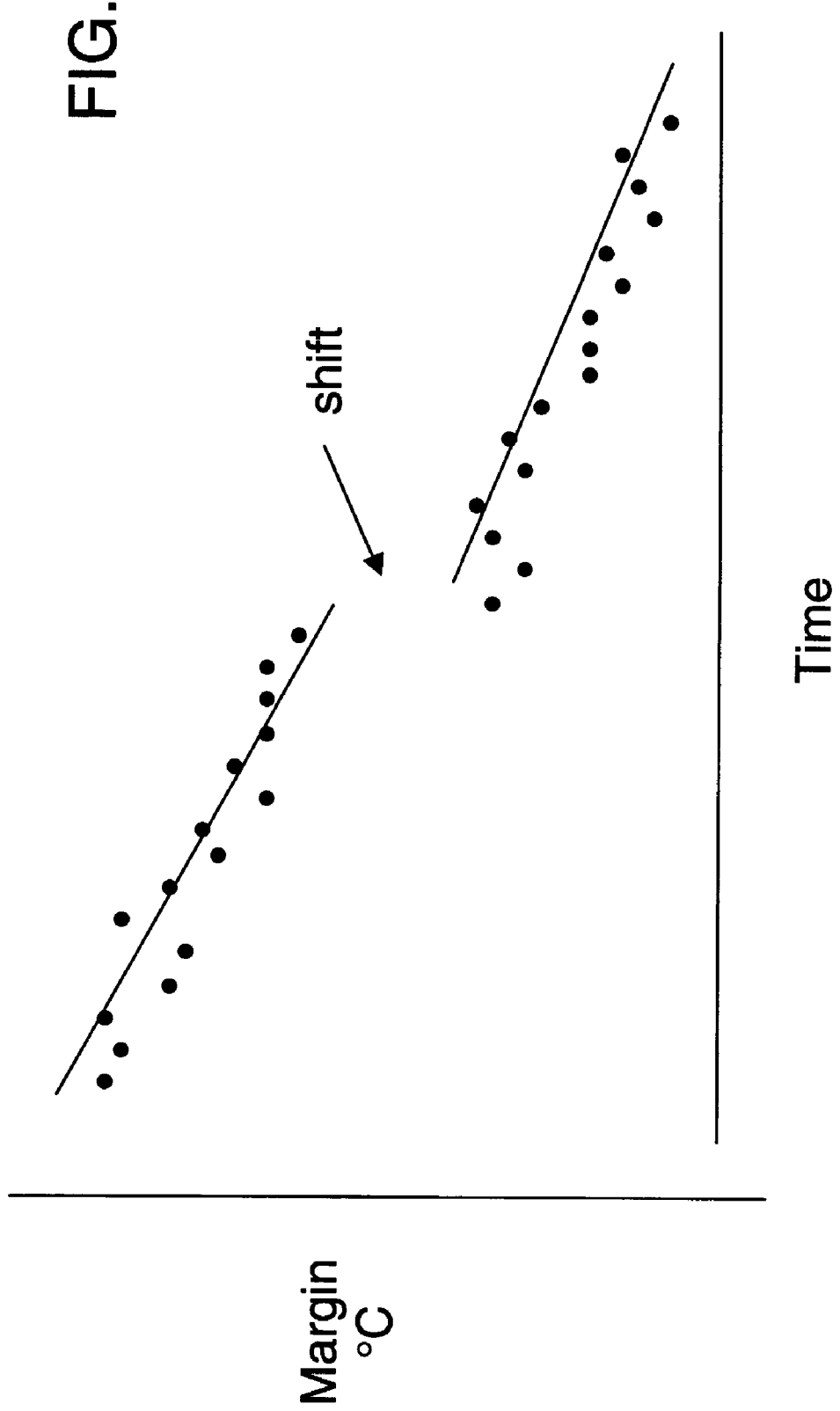
FIG. 8 is an exemplary graph of exhaust gas temperature difference from baseline model.
Figure 9:
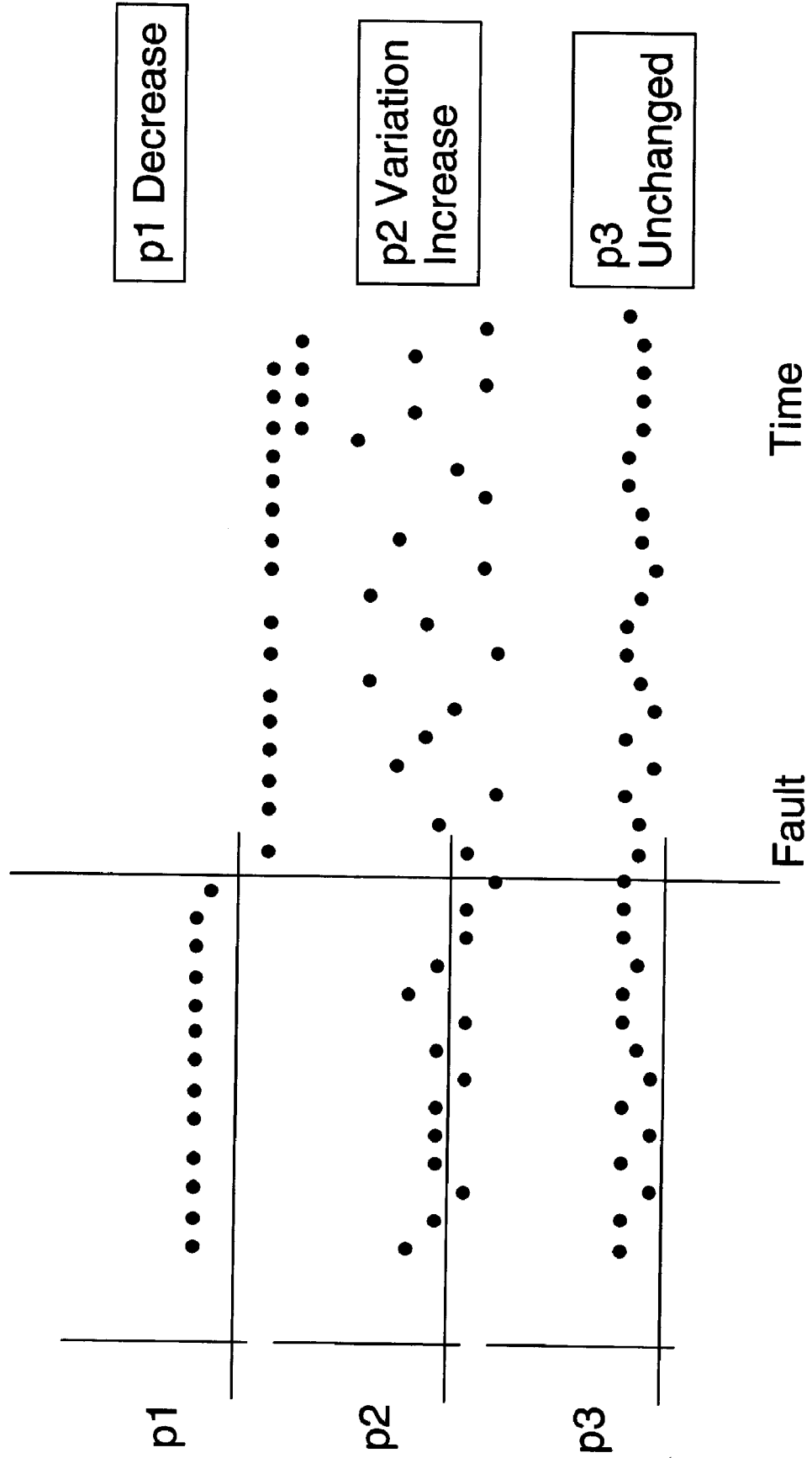
FIG. 9 is an exemplary graph of principal component analysis mapped data.

Principal component analysis involves a mathematical procedure that transforms a number of (possibly) correlated variables into a smaller number of uncorrelated variables which are called principal components. Of the identified components, the first accounts for as much of the variability in the data as possible, while each succeeding component accounts for as much of the remaining variability as possible. Referring now to FIGS. 8-10, there is shown a series of graphs illustrating a correlated data sets and how the principal component analysis embodiment of the present invention overcome correlation instability.

Figure 7:
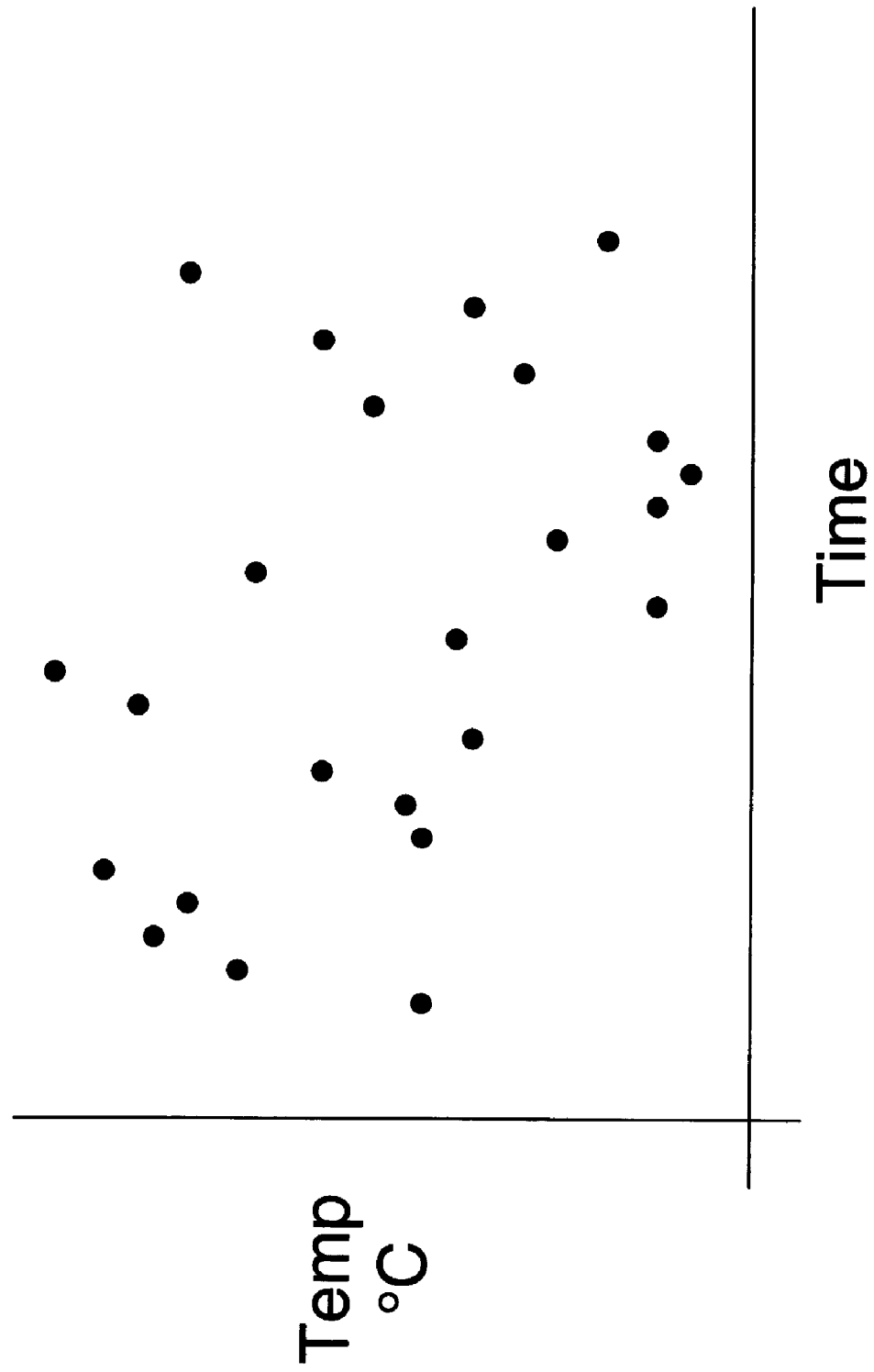
FIG. 7 is an exemplary graph of raw exhaust gas temperature data over time.

FIG. 7 is one example of a graph of raw exhaust gas temperature data over time (It should be understood that exhaust gas temperature is just one of a variety of engine performance variables which may apply to the given embodiment.) Once the time-adjusted regression analysis has been performed, a clear baseline shift with respect to the exhaust gas temperature variable is demonstrated in FIG. 8. However, because changes in various ones of the measured parameters necessarily affect other parameters through a naturally occurring correlation, these correlations must be removed to generate stable estimates.

Accordingly, a principal component analysis is performed in which initial engine data is mapped by the preprocessing component to uncorrelated datasets using the principal component analysis technique. FIG. 9 illustrates a graph of one resulting data set with new principal components p1, p2 and p3.

The foregoing flow charts of FIGS. 3-5 of this disclosure shows the functionality and operation of the engine baseline modeling system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as C and Java, however, other computer programming languages can be used. Also, the engine service database 30 may be constructed using commercial databases including standard relational, object-oriented or hierarchical databases. Data manipulation operations, including retrieval, creation, modification, and deletion, can be implemented within the programming languages or within the database using stored procedures or triggers or combinations.

The above-described engine baseline modeling system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

Figure 6:
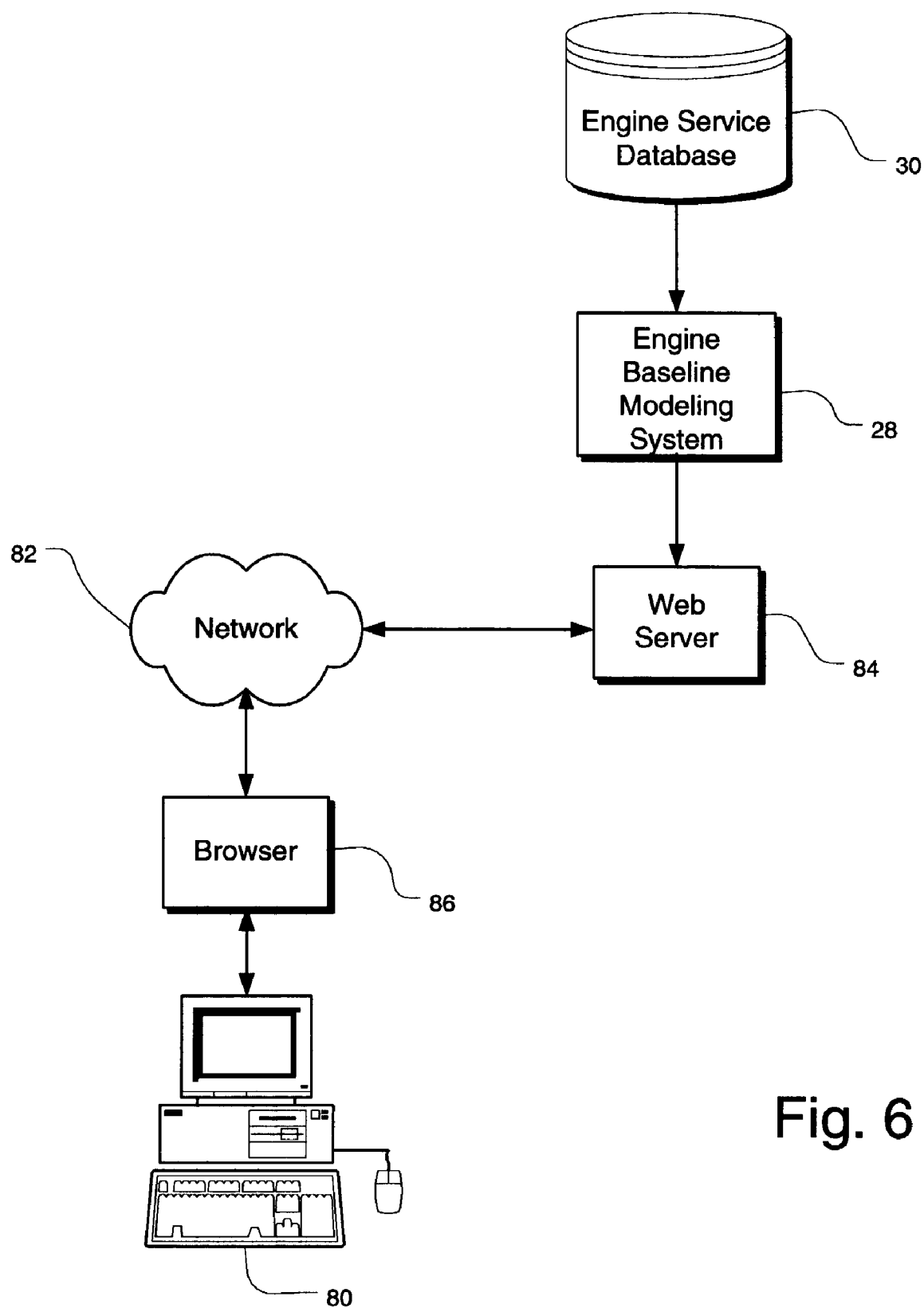
FIG. 6 shows an architectural diagram of a system for implementing the engine baseline modeling system shown in FIG. 2.

FIG. 6 shows an architectural diagram of a system 78 for implementing the engine baseline modeling system 28 shown in FIG. 2 in a networked environment. In FIG. 6, a user uses a computing unit 80 to access the engine baseline modeling system 28 and engine service database 30. More specifically, the computing unit 80 connects to the engine baseline modeling system 28 and engine service database 30 through a communication network 82 such as an electronic or wireless network. The computing unit 80 can take the form of a hand-held digital computer, personal digital assistant computer, notebook computer, personal computer or workstation, while the communications network may be a private network such as an extranet or intranet or a global network such as a WAN (e.g., Internet). A web server 84 serves the engine baseline modeling system 28 and the engine service database 30 to the user in the form of web pages. The web pages can be in the form of HTML, however, other formats and structures can be used such as SGML, XML or XHTML. The user uses a web browser 86 running on the computing unit 80 such as Microsoft INTERNET EXPLORER, Netscape NAVIGATOR or Mosaic to locate and display the web pages generated from the engine baseline modeling system 28 and engine service database 30.

If desired, the system 78 may have functionality that enables authentication and access control of users accessing the web pages linked to the engine baseline modeling system 28. Both authentication and access control can be handled at the web server level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database, however, other directory type databases with other types of schema may be used including relational databases, object-oriented databases, flat files, or other data management systems.

It is apparent that there has been provided in accordance with this invention, a baseline modeling system, method and computer product. While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

The invention claimed is:

1. A system for building an engine baseline model for fuel-powered engines, comprising:
   a computer comprising:
   one or more processors;
   a memory configured to store a program of instructions;
   an engine service database containing engine data for fuel-powered engines;
   a data segmenting component that segments the engine data into a plurality of groups, and each group clusters a portion of the engine data based on similarities in data of engine operating parameters, based on each specific engine, and based on time periods of data acquisition; and
   an engine baseline modeling component that builds an engine baseline model for each of the plurality of groups using regression analysis, wherein the regression analysis relates engine performance variables as functions of the engine operating parameters as related by the engine baseline model for a group; and
   a display configured to display the engine performance variables as functions of the engine operating parameters as related by the engine baseline model for a group.

2. The system of claim 1, wherein the data segmenting component segments the engine data into the plurality of groups throughout a pre-selected moving time window.

3. The system of claim 1, wherein the data segmenting component segments the engine data into the plurality of groups throughout discrete time ranges.

4. The system of claim 1, wherein the engine baseline modeling component generates a set of estimated regression parameters for each of the plurality of groups based upon the regression analysis, wherein each set of estimated regression parameters are representative of the baseline model for that group.

5. The system of claim 4, wherein the engine baseline modeling component calculates a time series for each estimated regression parameter, and wherein the engine baseline modeling component further calculates a trend for each estimated regression parameter over time.

6. The system of claim 4, further comprising:
   means for identifying fluctuations in trends for each estimated regression parameter representative of engine faults;
   means for evaluating trends having identified fluctuations; and
   means for identifying parameters estimating trends relating to baseline trend shifts.

7. The system of claim 1, further comprising a preprocessor that comprises a data acquisition component that extracts engine data from the engine service database.

8. The system of claim 7, wherein the preprocessor maps engine data to an uncorrelated data set using a principal component analysis technique.

9. The system of claim 8, wherein the engine baseline modeling component comprises a heuristics component that generates rules for cleaning the preprocessed data.

10. The system of claim 1, wherein the engine baseline modeling component comprises a metric component that validates the engine baseline model.

11. The system of claim 1, further comprising a model diagnostics component that evaluates performance of the engine baseline model.

12. The system of claim 1, wherein the engine service database comprises historical service information.

13. The system of claim 1, wherein the plurality of groups comprise a plurality of different engine performance variables.

14. The system of claim 1, wherein the each group represents a cluster of similar data of engine operating parameters comprising altitude, air speed, air temperature, fuel specific heat value, air humidity, control settings, or a combination thereof.

15. A computer implemented method for building an engine baseline model for fuel-powered engines, comprising:
   storing engine data in an engine service database for fuel-powered engines;
   processing the engine data into a predetermined format in a preprocessor, wherein the processing includes segmenting the engine data into a plurality of groups based upon similarities in data of engine operating parameters, based on each specific engine and further based upon specific time periods during which each data was measured;
   building an engine baseline model for each of the plurality of groups using regression analysis, wherein the regression analysis relates engine performance variables as functions of the engine operating parameters;

using the engine baseline model to monitor engine status, predict future engine behavior, diagnose engine faults, identify when engine performance is out of specification or identify engine quality, or a combination thereof.

16. The method of claim 15, further comprising segmenting the engine data into the plurality of groups throughout a pre-selected moving time window.

17. The method of claim 15, further comprising segmenting the engine data into the plurality of groups throughout discrete time ranges.

18. The method of claim 15, further comprising generating a set of estimated regression parameters for each of the plurality of groups based upon the regression analysis, wherein each set of estimated regression parameters are representative of the baseline model for that group.

19. The method of claim 18, further comprising:
calculating a time series for each estimated regression parameter; and
calculating a trend for each estimated regression parameter over time.

20. The method of claim 18, further comprising:
identifying fluctuations in trends for each estimated regression parameter representative of engine faults;
evaluating trends having identified fluctuations; and
identifying parameters estimating trends relating to baseline trend shifts.

21. The method of claim 15, wherein the processing step further comprising extracting engine data from the engine service database.

22. The method of claim 21, further comprising mapping engine data to an uncorrelated data set using a principal component analysis technique.

23. The method of claim 22, further comprising generating rules for cleaning the preprocessed data.

24. The method of claim 15, further comprising validating the engine baseline model.

25. The method of claim 15, further comprising evaluating performance of the engine baseline model.

26. The method of claim 15, wherein the engine service database comprises engine repair history.

27. The method of claim 15, wherein the plurality of groups are representative of different clusters of similar data of engine operating parameters comprising altitude, air speed, air temperature, fuel specific heat value, air humidity, control settings, or a combination thereof.

28. A computer-readable storage medium incorporating computer instructions which when executed on a computer perform a process for building an engine baseline model for fuel-powered engines, comprising:
instructions for storing engine data in an engine service database for fuel-powered engines;
instructions for processing the engine data into a predetermined format in a preprocessor, wherein the instructions for processing include instructions for segmenting the engine data into a plurality of groups based upon similarities in data of engine operating parameters, and further based upon specific time periods during which each data was measured;
instructions for building an engine baseline model for each of the plurality of groups using regression analysis, wherein the regression analysis relates engine performance variables as functions of the engine operating parameters;
instructions for using the engine baseline model to monitor engine status, predict future engine behavior, diagnose engine faults, identify when engine performance is out of specification or identify engine quality, or a combination thereof.

29. The computer-readable storage medium of claim 28, further comprising instructions for segmenting the engine data into the plurality of groups throughout a pres-selected moving time window.

30. The computer-readable storage medium of claim 28, further comprising instructions for segmenting the engine data into the plurality of groups throughout discrete time ranges.

31. The computer-readable storage medium of claim 28, further comprising instructions for generating a set of estimated regression parameters for each of the plurality of groups based upon the regression analysis, wherein each set of estimated regression parameters are representative of the baseline model for that group.

32. The computer-readable storage medium of claim 31, further comprising:
instructions for calculating a time series for each estimated regression parameter; and
instructions for calculating a trend for each estimated regression parameter over time.

33. The computer-readable storage medium of claim 31, further comprising:
instructions for identifying fluctuations in trends for each estimated regression parameter representative of engine faults;
instructions for evaluating trends having identified fluctuations; and
instructions for identifying parameters estimating trends relating to baseline trend shifts.

34. The computer-readable storage medium of claim 28, wherein the instructions for processing in the preprocessor further comprise instructions for extracting engine data from the engine service database.

35. The computer-readable storage medium of claim 34, further comprising instructions for mapping engine data to an uncorrelated data set using a principal component analysis technique.

36. The computer-readable storage medium of claim 35, further comprising instructions for generating rules for cleaning the preprocessed data.

37. The computer-readable storage medium of claim 28, further comprising instructions for validating the engine baseline model.

38. The computer-readable storage medium of claim 28, further comprising instructions for evaluating performance of the engine baseline model.

39. The computer-readable storage medium of claim 28, wherein the plurality of groups are representative of different clusters of similar data of engine operating parameters comprising altitude, air speed, air temperature, fuel specific heat value, air humidity, control settings, or a combination thereof.

40. A computer implemented method for building an engine baseline model for combustion-based engines, comprising:
storing engine data in an engine service database for combustion-based engines;
clustering the engine data into a plurality of groups each based on similarities in data of engine operating parameters, based on each specific engine, and based on time periods of data acquisition;
building an engine baseline model for each of the plurality of groups using regression analysis, wherein the regression analysis relates engine performance variables as functions of the engine operating parameters; and displaying the engine performance variables as functions of the engine operating parameters as related by the engine baseline model for a group.

41. A computer-readable storage medium incorporating computer instructions, which when executed on a computer perform a process for building an engine baseline model for combustion-based engines, comprising:

instructions for storing engine data in an engine service database for combustion-based engines;

instructions for segmenting the engine data into a plurality of groups representative of different clusters of similar data of engine operating parameters comprising altitude, air speed, air temperature, fuel specific heat value, air humidity, control settings or a combination thereof;

instructions for building an engine baseline model for each of the plurality of groups using regression analysis, wherein the regression analysis relates engine performance variables as functions of engine operating parameters; and instructions for displaying the engine performance variables as functions of the engine operating parameters as related by the engine baseline model for a group.

* * * * *